(12) United States Patent
Nguyen

(10) Patent No.: US 9,618,130 B1
(45) Date of Patent: Apr. 11, 2017

(54) MULTI-PURPOSE VALVE FOR EXTENDING SHELF-LIFE USING VACUUMING OR INJECTING GAS

(71) Applicant: Trong D Nguyen, Sacramento, CA (US)

(72) Inventor: Trong D Nguyen, Sacramento, CA (US)

( * ) Notice: Subject to any disclaimer, the term of this patent is extended or adjusted under 35 U.S.C. 154(b) by 0 days.

(21) Appl. No.: 14/953,398

(22) Filed: Nov. 29, 2015

(51) Int. Cl.
*F16K 15/20* (2006.01)
*F16K 15/14* (2006.01)
*B65D 30/24* (2006.01)
*B65D 1/10* (2006.01)

(52) U.S. Cl.
CPC .............. *F16K 15/147* (2013.01); *B65D 1/10* (2013.01); *B65D 31/147* (2013.01)

(58) Field of Classification Search
CPC ...... F16K 15/147; F16K 15/20; F16K 15/207; F16K 15/14; F16K 15/205; F16K 15/144; B65D 1/10; B65D 31/147; B65D 81/052; A63B 41/00; B60C 23/10; B60C 29/00; B60C 29/002; B60C 29/005; B60C 29/06; B60C 29/064; B60C 29/066; B60C 23/0496; B64B 1/58; F04B 33/00; F04B 33/005; F04B 53/1037; F04B 53/1047; F04B 53/1057; A47C 27/081; B63C 9/24; B25B 27/24
USPC .................................. 137/223, 232–234, 227
See application file for complete search history.

(56) References Cited

U.S. PATENT DOCUMENTS

| | | | |
|---|---|---|---|
| 2,839,073 A * | 6/1958 | Marsh | F16K 15/202 137/232 |
| 3,159,176 A | 12/1964 | Russell | |
| 3,405,838 A | 10/1968 | Preisendanz | |
| 3,517,682 A * | 6/1970 | Smith | F16K 15/202 137/223 |
| 3,880,187 A | 4/1975 | Kneusel | |
| 3,941,149 A | 3/1976 | Mittleman | |
| 4,077,429 A | 3/1978 | Kimball | |
| 4,181,145 A | 1/1980 | Mitchell | |
| 4,349,035 A | 9/1982 | Thomas et al. | |
| 4,434,810 A | 3/1984 | Atkinson | |
| 4,443,219 A * | 4/1984 | Meisch | A61F 5/4405 604/256 |

(Continued)

FOREIGN PATENT DOCUMENTS

WO          9808748 A          3/1998

OTHER PUBLICATIONS

Vacuvin storage containers, web site, vacuvin.com/286/357/ Vacuum-Container-(Small-0,650L), Oct. 2015.

(Continued)

*Primary Examiner* — Craig J Price
(74) *Attorney, Agent, or Firm* — Ernesto Garcia

(57) ABSTRACT

A multifunctional valve features a pumping function and a vacuuming function. The valve can be implemented in any closed container having a removable lid or a bag having a resealable zipper or any other similar sealable feature. The valve also features a tethered plug to additionally provide sealing. The valve incorporates a spacer or washer when used in thin walls to provide support. When the valve is used with a bag, the spacer or washer incorporates footing so that the valve does not collapse on its own when the valve is used in conjunction with a vacuum pump or a gas pump.

19 Claims, 4 Drawing Sheets

(56) References Cited

U.S. PATENT DOCUMENTS

| | | | |
|---|---|---|---|
| 4,823,831 A * | 4/1989 | Jaw | F16K 15/202 137/223 |
| 4,924,899 A * | 5/1990 | Po | A63H 3/06 137/232 |
| 4,926,908 A | 5/1990 | Dschida | |
| 4,944,732 A * | 7/1990 | Russo | A61J 15/0015 604/105 |
| 5,007,449 A * | 4/1991 | Marrone, II | F16K 15/185 137/223 |
| 5,031,785 A | 7/1991 | Lemme | |
| 5,083,581 A * | 1/1992 | Jaw | F16K 15/202 137/223 |
| 5,119,842 A * | 6/1992 | Jaw | B60P 7/065 137/232 |
| 5,125,897 A * | 6/1992 | Quinn | A61J 15/0015 604/175 |
| 5,249,598 A | 10/1993 | Schmidt | |
| 5,336,203 A * | 8/1994 | Goldhardt | A61J 15/0038 604/247 |
| 5,343,889 A * | 9/1994 | Jaw | F16K 15/202 137/232 |
| 5,535,900 A | 7/1996 | Huang | |
| 5,941,391 A | 8/1999 | Jury | |
| 5,944,211 A * | 8/1999 | Woodnorth | B65D 81/2038 220/203.13 |
| 5,997,503 A * | 12/1999 | Willis | A61J 15/0015 604/103.07 |
| 5,997,546 A * | 12/1999 | Foster | A61J 15/0042 604/96.01 |
| 6,019,746 A * | 2/2000 | Picha | A61J 15/0015 604/175 |
| 6,164,314 A * | 12/2000 | Saputo | F16K 15/202 137/232 |
| 6,419,670 B1 * | 7/2002 | Dikeman | A61J 15/0015 604/533 |
| 6,453,940 B1 | 9/2002 | Tipton et al. | |
| 6,460,560 B1 * | 10/2002 | Weinheimer | F16K 15/205 137/232 |
| 6,637,321 B2 | 10/2003 | Wang | |
| 6,814,639 B1 * | 11/2004 | Peterson | F16K 15/205 441/41 |
| 6,878,130 B2 * | 4/2005 | Fournie | A61J 15/0015 604/100.01 |
| 6,908,449 B2 * | 6/2005 | Willis | A61F 5/445 604/103.06 |
| 6,990,994 B2 * | 1/2006 | Reeb | F16K 15/205 137/223 |
| 7,048,136 B2 | 5/2006 | Havens et al. | |
| 7,051,753 B1 * | 5/2006 | Caires | F16K 15/205 137/232 |
| 7,108,147 B2 * | 9/2006 | Cheung | F16K 17/28 137/533.31 |
| 7,124,489 B2 * | 10/2006 | Triebes | A61M 25/001 264/239 |
| 7,243,676 B2 * | 7/2007 | Bailey | A61M 39/24 137/493.1 |
| 7,892,209 B2 * | 2/2011 | Harand | A61M 16/0463 604/167.01 |
| 7,921,874 B2 * | 4/2011 | Tekulve | F16K 15/147 137/513.3 |
| 8,142,394 B1 * | 3/2012 | Rotella | A61J 15/0015 604/100.03 |
| 8,146,765 B2 | 4/2012 | Chen | |
| 8,337,470 B2 | 12/2012 | Prasad et al. | |
| 8,413,857 B2 * | 4/2013 | Johnson | B65D 75/5877 222/105 |
| 8,579,870 B2 * | 11/2013 | Willis | A61F 5/445 604/167.04 |
| 8,584,695 B2 * | 11/2013 | Lau | F16K 15/202 137/232 |
| 9,033,930 B2 * | 5/2015 | Griffith | A61J 15/0065 604/174 |
| D735,525 S * | 8/2015 | Nguyen | F04B 53/127 D23/233 |
| 9,126,014 B2 * | 9/2015 | Yamoto | A61J 15/0042 |
| 9,453,453 B2 * | 9/2016 | Nakajima | F01P 1/06 |
| 2002/0077603 A1 | 6/2002 | Willis | A61J 15/0042 604/246 |
| 2003/0045841 A1 * | 3/2003 | Palcisko | A61J 15/0092 604/256 |
| 2003/0150487 A1 * | 8/2003 | Wu | F16K 15/20 137/223 |
| 2004/0103987 A1 * | 6/2004 | Triebes | A61M 25/1036 156/294 |
| 2005/0109398 A1 * | 5/2005 | Huang | F16K 15/147 137/223 |
| 2005/0187524 A1 * | 8/2005 | Willis | A61F 5/445 604/256 |
| 2007/0074760 A1 * | 4/2007 | Wu | A47C 27/082 137/223 |
| 2007/0276356 A1 * | 11/2007 | Downing | A61M 39/12 604/535 |
| 2008/0119793 A1 * | 5/2008 | Adams | A61J 15/0042 604/174 |
| 2008/0185061 A1 * | 8/2008 | Fisk | F16K 15/147 137/846 |
| 2008/0196768 A1 * | 8/2008 | Steffan | F16L 55/115 137/232 |
| 2009/0139582 A1 * | 6/2009 | Franta | F16K 15/202 137/232 |
| 2010/0057013 A1 * | 3/2010 | Harada | A61J 15/0015 604/175 |
| 2010/0176152 A1 * | 7/2010 | Johnson | B65D 75/5877 222/92 |
| 2012/0161044 A1 | 6/2012 | Chen | |
| 2015/0037113 A1 * | 2/2015 | Maness | F16K 15/063 410/119 |
| 2016/0003365 A1 * | 1/2016 | Park | F16K 15/148 220/212.5 |
| 2016/0186874 A1 * | 6/2016 | Lin | F16K 15/202 137/232 |

OTHER PUBLICATIONS

Vacuware, web site, vacuware.com, Oct. 2015.
Kinetic Premier containers, web site, www.kinetic-cookware.com/premier, Oct. 2015.
Vacuumsaver, web site, www.vacuumsavercom/product/?type_id=7, Oct. 2015.
Foodsaver containers, web site, www.foodsaver.com/accessories-and-parts/containers/, Oct. 2015.
Vernay Flow Controls, web site, www.vernay.com/Markets/Medical/Product-Categories/Combination-Valves.aspx, Oct. 2015.
Minivalve combination valves, web site, www.minivalve.com/newsite/index.php/en/by-type/duckbill-umbrella-combination-valves/how-they-work, Oct. 2015.

* cited by examiner

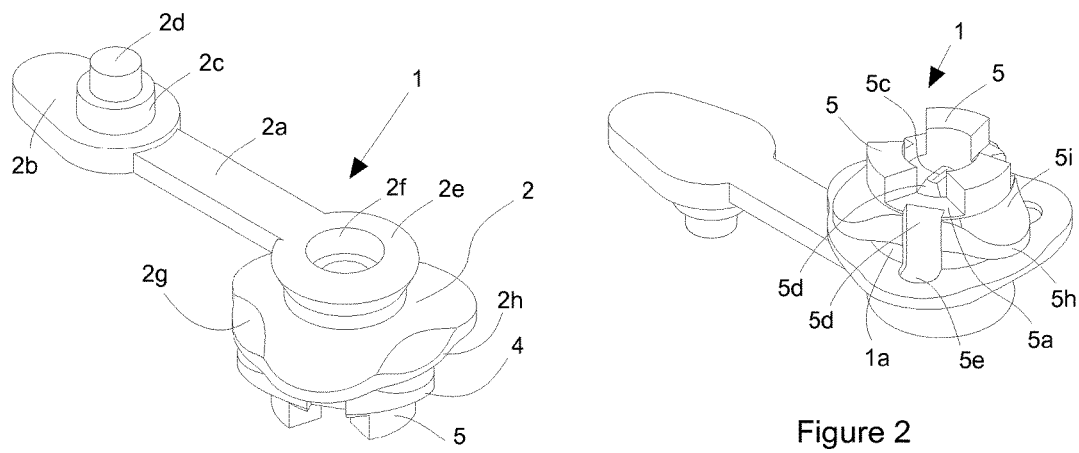
Figure 1
Figure 2
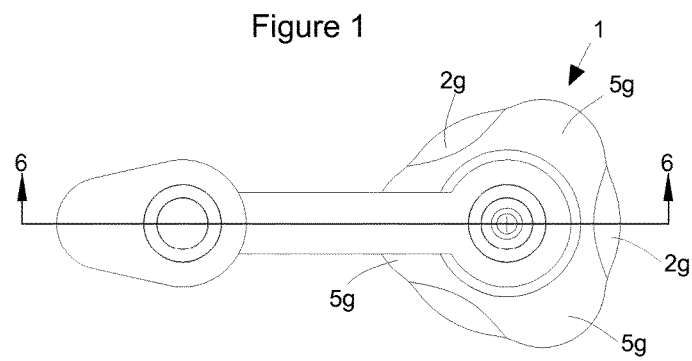
Figure 3
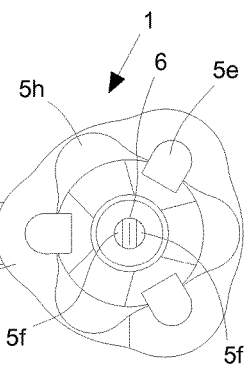
Figure 4
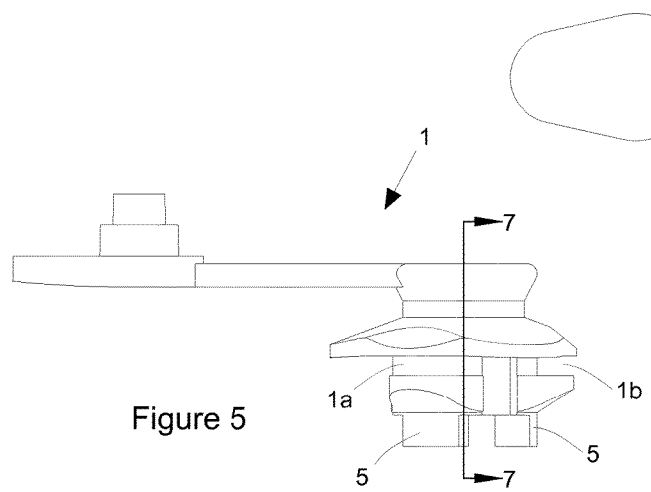
Figure 5

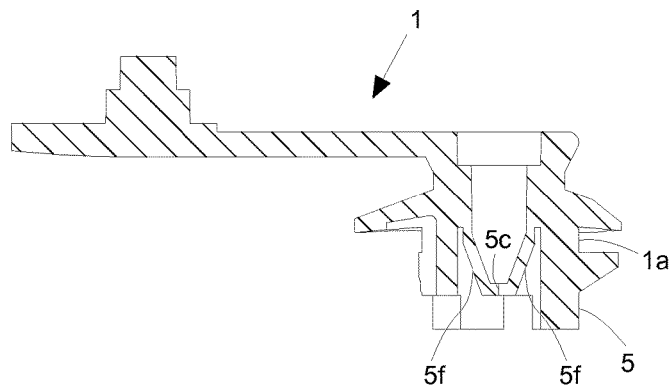
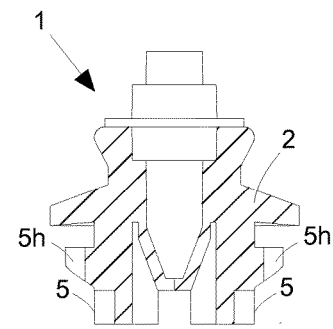
Figure 6                    Figure 7
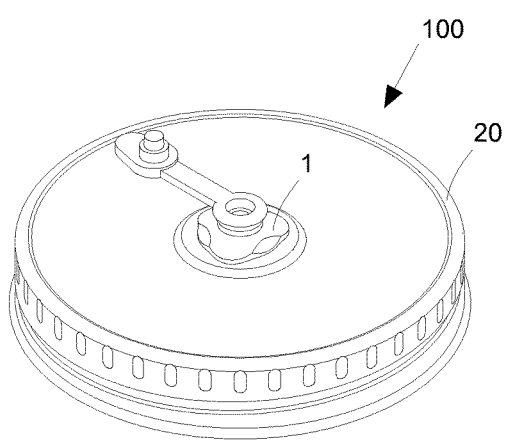
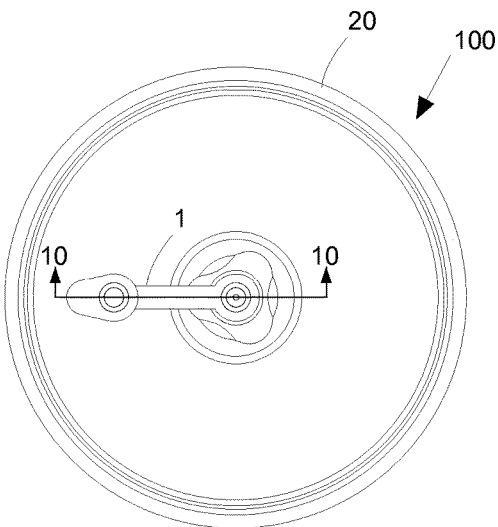
Figure 8
Figure 9
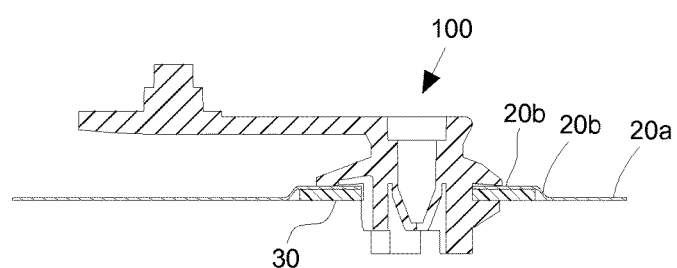
Figure 10

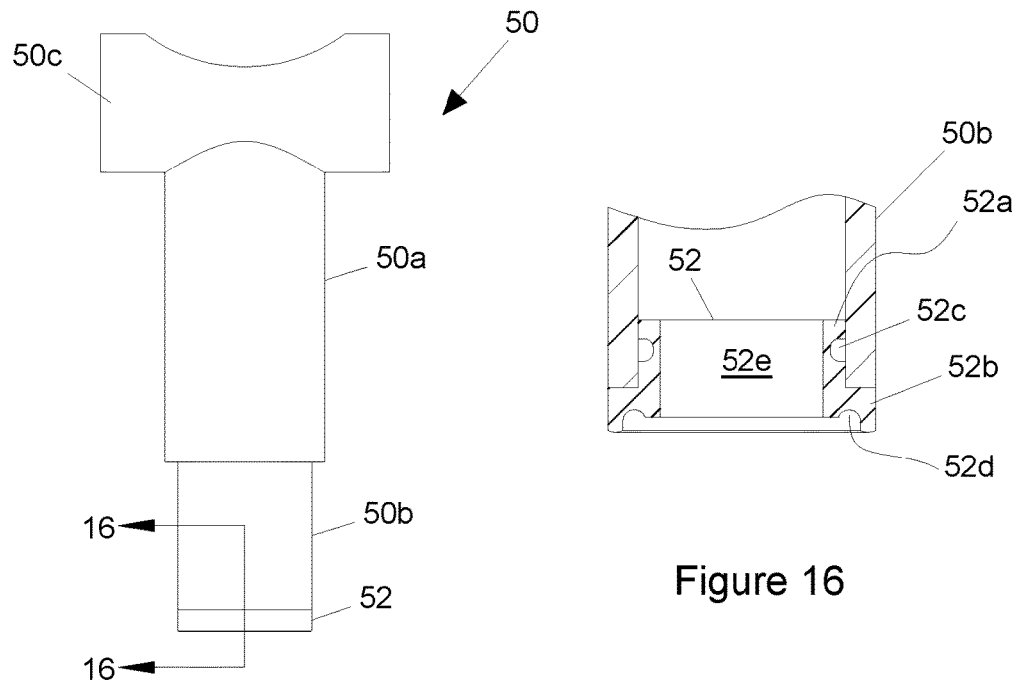
Figure 15
Figure 16
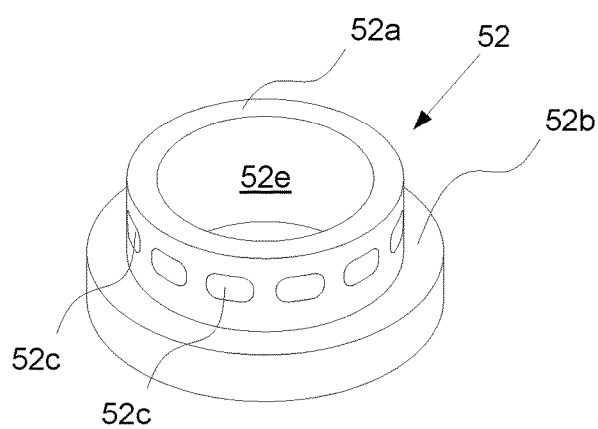
Figure 17

MULTI-PURPOSE VALVE FOR EXTENDING SHELF-LIFE USING VACUUMING OR INJECTING GAS

FIELD OF THE INVENTION

This disclosure is generally directed to a multi-purpose valve to be used with a vacuum pump or an injection pump that injects a gas such as nitrogen to extend the life of organic material.

BACKGROUND OF THE INVENTION

One-way valves are known in the art for food preservation. The applicant acknowledges that many have designed one-way valves to function in a similar fashion to vacuum air off a container. While prior art one-way valves only do vacuuming, no one has designed a valve where one has the option to inject to fill or flush a gas, or vacuum the gas off a container.

The closest prior known art is to Chen, U.S. Publication 2012/0161044 A1, which teaches a one-way valve to vacuum a closed container. The valve features a nipple and air passages that allow air to escape as one vacuums the container. Chen further uses an inverse hook that projects past a hole in a closed container. The inverse hook assimilates part of this invention in a structurally different way.

SUMMARY OF THE INVENTION

The present invention describes a multi-functional valve for injecting a gas, flushing, or vacuuming out gas or air from a closed volume such as a container or sealable bag to preserve its content. The valve includes a duckbill with a slit that can be further sealed with a tethered plug that fits into an opened nipple. As such the valve of the present invention can be reverted to a one-way valve whenever the duckbill is closed with the tethered plug. The valve also incorporates a footing that provides clearance to the duckbill as one injects a gas or vacuums the closed volume. The duckbill further features opposed tapered outside surfaces to assist in providing radial forces to close the slit.

Similar to other one-way valves, the instant valve includes at least one axial passageway in flow with a radial passageway partly under a collapsible flap to let gas escape as one vacuums the closed container. When one manually presses down on the opened nipple, at least one of the flaps will collapse and break the vacuum. An improvement is the combination with the one-way feature of the valve with the duckbill, which allows for injection of a gas through the duckbill and have it fill and flush the container by pushing any air inside a container to exist through the axial and radial passageways. This is merely done by putting a nozzle of the injecting can against the valve and pressing further to have the flap collapse to open the valve in a way acting as a two-way valve or put the valve in a flush mode. In another mode, the nozzle can slightly rest on the valve without pressing further and merely make the valve fill the container using pressure. This is called the fill mode.

It is envisioned that the valve will work with a cap of a container that has a thread or any other fastening means for keeping the container closed. It is envisioned that the valve includes a retaining gap where a support wall of the container is retained when the valve passes through an opening in the cap. In most instances, the retaining gap has a dimension that is similar to a wall thickness of the support wall. In instances where the support wall is thin such as a resealable bag or a thin sheet metal cap, a spacing washer is used to take up space keeping the valve held down.

The valve is envisioned to have one flush a bowl or cooking pot with gas and then vacuum to create a negative pressure inside to hold the lid in place to keep the gas in and air out. Flushing will entail filling the container with gas, while pushing any air inside the container out until a desired level of gas has entered the container. When the time comes to take the lid off, one can devacuum or break the vacuum gently to avoid splashing of liquid inside by removing the tethered cap. Removing the tethered cap will slowly break the vacuum. To break the vacuum much faster, one simple pushes the nipple to the side thus devacuuming faster. One other benefit of the flush and fill method, and then vacuum is to reduce the volume of gas required to bring oxygen down to a desired level. For example, it takes 4× the volume (headspace inside a container) of gas to bring oxygen from 21% to 1.5%, but only 2× of volume of gas to achieve 5.25% and then vacuum to get to 2% of oxygen. Vacuuming by hand pump or a typical powered pump can only reduce oxygen by about half.

BRIEF DESCRIPTION OF THE DRAWINGS

FIG. 1 shows an isometric top view showing a valve.

FIG. 2 shows an isometric bottom view of the valve shown in FIG. 1.

FIG. 3 shows a top view of the valve shown in FIG. 1.

FIG. 4 shows a bottom view of the valve shown in FIG. 1.

FIG. 5 shows a side view of the valve shown in FIG. 1.

FIG. 6 shows cross-sectional view 6-6 shown in FIG. 3.

FIG. 7 shows cross-sectional view 7-7 shown in FIG. 5.

FIG. 8 shows an isometric view of a Mason jar cap utilizing the valve in FIG. 1.

FIG. 9 shows a top view of the Mason jar cap shown in FIG. 8.

FIG. 10 shows cross-sectional view 10-10 shown in FIG. 8.

FIG. 15 shows a generic vacuum pump utilizing a novel pump shoe.

FIG. 16 shows cross-sectional view 16-16 in FIG. 15 showing a lower area of a generic vacuum pump.

FIG. 17 shows an isometric view of the novel pump shoe used in a generic vacuum pump.

DETAIL DESCRIPTION OF THE DRAWINGS

Figure 11:
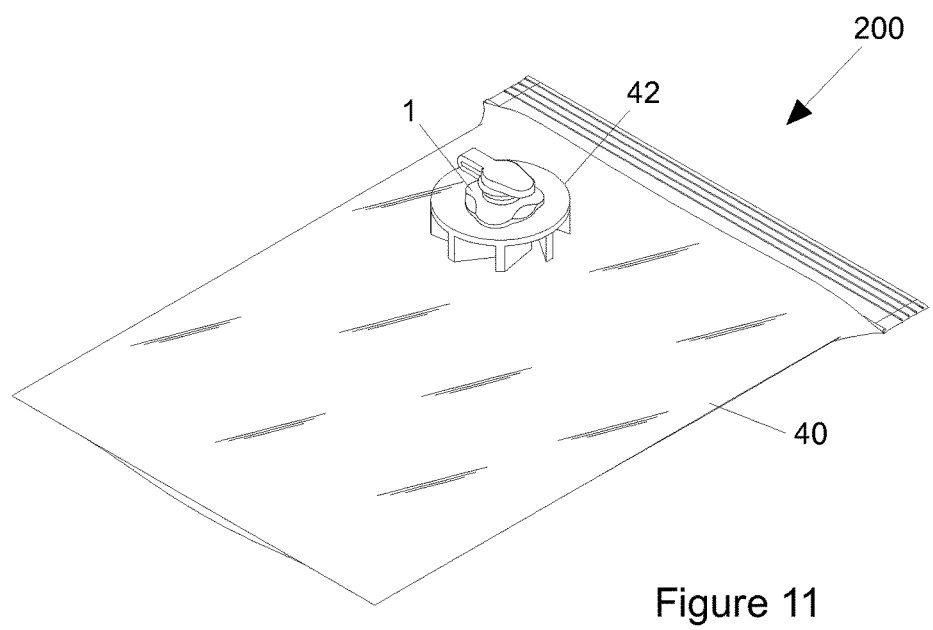
FIG. 11 shows an isometric view of a resealable bag utilizing the valve of FIG. 1.

FIGS. 1 to 5 show a multi-purpose valve 1. The valve 1 features a hollow core 1a separating a first annular flange 2 and a second annular flange 4. A nipple 2e projects from the first flange 2. The first annular flange 2 has three spaced apart flaps 5g that thin out in thickness toward a distal end. Between two of the spaced apart flaps 5g is a connecting ledge 2h having a cutout 2g for reducing the connecting ledge 2h thus providing more flexibility to the flaps 5g, see FIG. 1. At least three axial vents 5d extend along the core 1a each into a radial vent 5e that is under each of the flaps 5g. A bore 2f extends from the end of the nipple 2e into the core 1a so as to make the valve 1 one-way valve and thus collapse to open under pneumatic load. The bore 2f can be a counterbore or a straight opening. FIG. 10 shows the valve 1 in a closed state. The height of the core 1a can be longer than the thickness of a wall of an end cap or can be adjusted to match the wall thickness of an end cap.

FIGS. 1 and 2 show the dual-purpose valve 1 further including a plug 2b that is tethered to the nipple 2e through a bridge 2a. The plug 2b includes a flange 2c that projects from the plug 2c. A boss 2d projects from the flange 2c and is coaxial with the flange 2c. The flange 2c and the boss 2d are designed to frictionally fit inside the bore 2f so as to be retained therein. The valve 1 further includes a duckbill 6 that extends coaxially from the bore 2f. The duckbill 6 is radially spaced from the core 1a as seen in FIGS. 6 and 7. The duckbill 6 comprises a hollow cone having a slit 5c at one end of the cone. The slit 5c provides a passageway for gas to pass through. A pair of opposed tapered flats 5f interrupt the outer periphery of the cone. The tapered flaps 5f assist in closing the slit 5c when positive pressure has reached inside a container.

As seen in FIGS. 1, 2, and 4, the second annular flange 4 comprises three retainers 5h each with a tapered guide 5i to assist the valve 1 to be placed in a circular opening. Projecting from the second annular flange 4 are three circumferentially spaced feet 5 which provide three channels 5a for gas to pass through. The purpose of the three spaced feet 5 is to prevent the valve 1 from sealing against a flexible wall of a sealable bag when either injecting gas or vacuuming the bag. The three spaced feet 5 space away a free end of the duckbill 6 from sealing as seen in FIGS. 6 and 7.

FIGS. 8 to 10 show a cap assembly 100 comprising the valve 1 mounted to a Mason jar cap 20. As best shown in FIG. 10, the Mason jar cap 20 includes a hole in a stamped out circular indentation 20b that extends from a support wall 20a. The circular indentation 20b forms a cylindrical cavity 20c enclosing a plastic washer 30 that is bonded to the circular indentation 20b. The plastic washer 30 provides a filler to take up the space needed to keep the valve 1 when used with a thin support wall 20a as the gap 1b between the annular flanges 2, 4 would be less than the thin wall especially when the valve 1 is used in thin sheet metal caps, thin plastic caps, or resealable bags.

Figure 12:
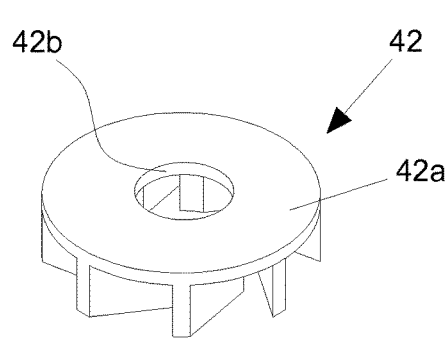
FIG. 12 shows an isometric top view of the footed washer used in the resealable bag shown in FIG. 11.
Figure 13:
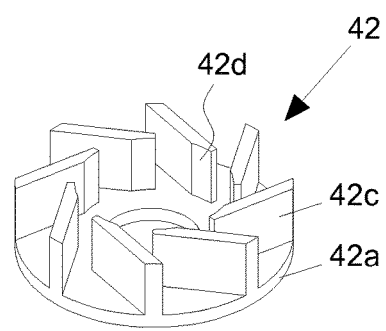
FIG. 13 shows an isometric bottom view of the footed washer used in the resealable bag shown in FIG. 11.
Figure 14:
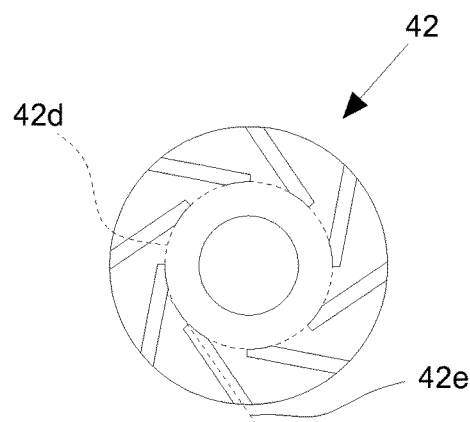
FIG. 14 shows a bottom view of the footed washer shown in FIG. 11.

FIGS. 11-13 shows a sealable bag assembly 200 comprising the valve 1 shown in FIG. 1 mounted to a sealable bag 40. FIG. 11 shows as best a clear sealable bag 40 but of course the bag can be opaque or colored. In this alternative application, a washer 42 is glued directly to the inside of the sealable bag 40 and aligned with a hole, not shown, in the bag 40. The washer 42 as shown in FIGS. 12 and 13, comprises a flat washer 42a with a central opening 42b for the valve to sit in place. At an opposite side of the washer 42, a series of angled standoffs 42c project from the washer 42. These standoffs are oriented in a circular circumference along the washer 42a and prevent any food containment from clogging the valve's operation. As seen in FIG. 14, the standoffs 42c include a slanted curved ledge 42d to provide clearance for the second annular flange of the valve. A longitudinal axis 42e of the standoffs 42c are oriented tangent to an imaginary circle 42d that is concentric to the central opening 42d of the washer 42. With this configuration, a flexible wall of a plastic bag cannot collapse onto and wrap feet 5 under vacuum to block air flow.

FIG. 15 shows a generic vacuum pump 50 typically used for wine bottles so its inner diameter is about 1.02" (26 mm). The pump is usually comprised of an outer telescoping tube 50a, an inner telescoping tube 50b and a handle 50c. The invention incorporates a novel pump shoe 52 that can fit any generic vacuum pump regardless of its outer shape. As seen in FIGS. 16 and 17, the pump shoe 52 is made of food grade silicone. The pump shoe 52 includes a main body 52a comprising a cylindrical wall with an internal opening 52e sized to fit the valve 1 when the valve 1 is capped. An external annular flange 52b extends from main body 52a. The main body 52a includes as series of vacuum cavities 52c around the perimeter of the main body 52a to allow the main body 52a to grip inside an internal surface of the inner telescoping tube 50b. Of course, it is envisioned to grip in vacuum pumps where it can grip the inside of an outer telescoping tube for those vacuum pumps that are configured in reverse. At the bottom of the pump shoe 52 is an annular groove 52d facing downward of the annular flange 52b to also provide for a vacuuming effect when one presses the vacuum pump against a container or a sealable bag.

It is envisioned that the valve 1 is to be made from a flexible material such as food grade silicone rubber or thermoplastic elastomer (TPE) of a desirable durometer. The washer alternatively can be made of a rigid material such as any metal or food grade plastic material. It is envisioned to inject a gas, through the valve, into a container using a pressurized source. It is envisioned that a hose will have a cylindrical fitting, not shown, that fits inside of the bore 2f or part of the counterbore to fill the volume of the container. The pressure coming from the gas source will allow the slit 5c to open up and as the container reaches a sustainable pressure the duckbill 6 will close itself and thus close the slit 5c. In this manner, the duckbill 6 is not touched or contaminated by the gas nozzle. While the dual-purpose of the valve 1 is to fill a container with any type of gas, it is envisioned that a vacuum pump can be used to remove any gas inside a container to prolong organic material inside the container as well. The vacuum pump will be designed to have a sealable rubberized rim that will form a closed space with the surround surface of the valve 1 to vacuum air or gas from inside the container when the tethered cap 2b is closing the duckbill of valve 1.

The invention is envisioned to be applied to many types of containers especially those that have any removable cap or lid using a thread connection, a hinging snap connection, any locking safety feature, or without any connection to the container. The negative pressure created during vacuuming can cause a lid to fix itself to a jar for instance. The cap or lid can be fixed to the container via a hinging feature or using a live hinge as commonly known in the art.

The present invention's structure uniquely offers five benefits to enclosed containers:
1 burp,
2 fill,
3 flush,
4 vacuum, and,
5 controllable de-vacuum in 2 modes, slow or fast.

Of the five benefits, filling valves for sport balls, etc., and vacuuming for wine bottles and food containers are well known in the art as far what one can do with a valve. However, burping, flushing, and controllable de-vacuuming are not. The flushing action requires injection with a nozzle pressing down on the valve to flex the three flaps 5g to let air out while filling is taking place. Burping refers to keeping an edge of the container's lid slight ajar while putting the lid on and pressing it down onto the jar's rim so to create slight negative pressure to help the lid's sealing function. The instant valve 1 assists in creating negative pressure by closing the lid and pressing hard on the lid to release or burp some air out of the container to generate negative pressure inside.

The invention claimed is:

1. A valve comprising a first annular flange, a second annular flange, a nipple, a hollow core, and a cap;
   wherein the core separates the flanges from each other establishing a gap between the flanges;
   wherein the nipple comprises a bore;
   wherein the cap comprising a flange extending from the cap to seal inside the bore; and,
   wherein a duckbill extends from the bore and includes a slit;
   wherein the first annular flange comprises at least two flexible tapered flaps, and a connecting ledge between the flaps; and,
   wherein the connecting ledge includes a cutout to provide flexibility to the flexible tapered flaps.

2. The valve of claim 1, wherein at least one footing projecting from the second annular flange and a channel delimits the at least one footing for air flow to access the slit.

3. The valve of claim 2, wherein one more channel delimits the at least one footing into two footings for air flow to access the slit.

4. The valve of claim 1, wherein the second annular flange includes at least one tapered surface to provide a guide for insertion to a hole in a container.

5. The valve of claim 4, wherein the second annular flange comprises at least two retainers and the tapered surface being on each of the retainers.

6. The valve of claim 5, wherein an axial vent extends between the two retainers and the hollow core; and,
   wherein a radial vent extends partly along the first annular flange.

7. The valve of claim 1, wherein the cap is tethered to the nipple.

8. A valve comprising a first annular flange, a second annular flange, a nipple, a hollow core, and a cap;
   wherein the core separates the flanges from each other establishing a gap between the flanges;
   wherein the nipple comprises a bore;
   wherein the cap comprising a flange extending from the cap to seal inside the bore; and,
   wherein a duckbill extends from the bore and includes a slit;
the valve in combination with a washer to be retained between the two annular flanges; and,
   wherein the washer includes a circular hole receiving the hollow core of the valve.

9. The valve of claim 8, further in combination with a support wall including a circular indentation offsetting the support wall into a cavity and a central hole;
   wherein the washer is adhesively bonded to the cavity;
   wherein the first annular flange engages the circular indentation; and,
   wherein the second annular flange resting against the washer.

10. The valve of claim 9, wherein the support wall comprises a jar cap.

11. The valve of claim 8, further in combination with a support wall including a circular hole;
   wherein the washer is adhesively bonded adjacent to the circular hole of the support wall;
   wherein the first annular flange engages the support wall; and,
   wherein the second annular flange resting against the washer.

12. The valve of claim 11, wherein the support wall comprises a sealable bag.

13. The valve of claim 8, wherein the washer further includes standoffs projecting from the washer;
   wherein the standoffs are circumferentially spaced along the washer; and,
   wherein a longitudinal axis of the standoffs are oriented tangent to an imaginary circle concentric to the circular hole of the washer.

14. A valve comprising a first annular flange, a second annular flange, a nipple, and a hollow core;
   wherein the core separates the flanges from each other establishing a gap between the flanges;
   wherein the nipple comprises a bore;
   wherein a duckbill extending from the bore and including a slit;
   wherein the duckbill comprises a cone shape and a pair of tapered surfaces interrupt the cone shape;
   wherein the slit sits midway between the tapered surfaces of the duckbill; and,
   wherein at least one footing projecting from the second annular flange and a channel delimits the at least one footing for air flow to access the slit;
wherein the first annular flange comprises at least two flexible tapered flaps, and a connecting ledge between the flaps; and,
   wherein the connecting ledge includes a cutout to provide flexibility to the flexible tapered flaps.

15. The valve of claim 14, wherein the second annular flange comprises at least two retainers and the tapered surface being on each of the retainers.

16. The valve of claim 15, wherein an axial vent extends between the two retainers and the hollow core; and,
   wherein a radial vent extends partly along the first annular flange.

17. The valve of claim 16, further in combination with a washer and a support wall including a circular indentation offsetting the support wall into a cavity and a central hole;
   wherein the washer is adhesively bonded to the cavity;
   wherein the first annular flange engages the circular indentation; and,
   wherein the second annular flange resting against the washer.

18. The valve of claim 16, further in combination with a washer and a support wall including an opening;
   wherein the washer further includes standoffs projecting from the washer;
   wherein the standoffs are circumferentially spaced along the washer; and,
   wherein a longitudinal axis of the standoffs are oriented tangent to an imaginary circle concentric to the circular hole of the washer.

19. The valve of claim 14, in combination with a pump shoe comprising a main body and a flange extending from the main body;
   the main body comprising an internal opening; and,
   wherein the main body includes a series of vacuum cavities around an external cylindrical perimeter of the main body to allow the main body to grip inside an internal surface of a vacuum pump.

* * * * *